United States Patent Office 3,288,838
Patented Nov. 29, 1966

3,288,838
2-PROPYNYL ESTER OF 1-(2-PROPYNYLOXY)-2-NAPHTHOIC ACID
Chester E. Pawloski, Bay City, Mich., assignor to The Dow Chemical Company, Midland, Mich., a corporation of Delaware
No Drawing. Filed Dec. 26, 1963, Ser. No. 333,699
1 Claim. (Cl. 260—473)

The present invention is directed to a compound corresponding to the formula

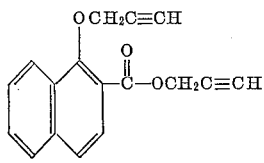

This compound is a solid material which is somewhat soluble in many organic solvents and of low solubility in water. The compound has been found to be useful as a pesticide for the control of various insect, mite, fish, worm, bacterial, and fungal organisms such as roundworms, beetles, roaches, blight, spider mites and crabgrass.

The new compound can be prepared by reacting 1-hydroxy-2-naphthoic acid with a propargyl halide such as propargyl bromide or propargyl chloride. The reaction is carried out in the presence of a basic material and preferably in a liquid reaction media such as isopropanol, acetone, diethyl ketone or methyl ethyl ketone. The reaction takes place smoothly at temperatures at which the halide of reaction is produced and preferably at temperatures of from about 0 to 100° C. The halide of reaction appears in a reaction mixture as a salt of the metal moiety from the employed base. Good results are obtained when employing one molecular proportion of 1-hydroxy-2-naphthoic acid and at least one molecular proportion, preferably an excess, of each of the propargyl halide and the basic material. The reaction consumes two moles of propargyl halide and two moles of basic material for every mole of 1-hydroxy-2-naphthoic acid and it is preferable to employ the reactants in such proportions when optimum yields are desired. Upon completion of the reaction the desired product can be separated and purified by conventional procedures.

In carrying out the reaction the 1-hydroxy-2-naphthoic acid, propargyl halide and basic material such as an alkali metal carbonate can be combined in any convenient fashion. However, it is preferable to disperse the reactants in an organic liquid as reaction medium. The resulting mixture is then brought to reaction temperature and maintained at that temperature until there is a substantial cessation in the production of the halide of reaction. The reaction mixture can then be filtered to remove the halide of reaction and the filtrate used in pesticidal compositions or further purified by conventional procedures. In a preferred procedure, the hot reaction mixture is combined with aqueous alkali metal hydroxide and heated for a short period. The reaction mixture is then filtered to remove the halide of reaction. The crude organic product which is separated from the filtrate can then be employed as the toxic constituent in pesticidal compositions or further purified by heating to remove the low boiling constituents.

In a representative operation, 1-hydroxy-2-naphthoic acid (50 grams), propargyl bromide (70 grams), and potassium carbonate (75 grams) were dispersed in 500 milliliters of acetone, and the resulting mixture heated at the boiling temperature and under reflux for twenty-four hours. The reaction mixture was then combined with 60 milliliters of an aqueous 33 percent sodium hydroxide and the resulting mixture heated for another four hours. The warm reaction mixture was filtered to remove the halide of reaction. The organic layer which separated in the filtrate was collected by decantation and heated to remove the low boiling constituent and obtain the 2-propynyl ester of 1-(2-propynyloxy)-2-naphthoic acid product as a solid residue melting at 48–52° C.

The novel product of the present invention is useful as a pesticide for the control of the growth and killing of insect, mite, fish, bacterial, fungal and plant organisms. For such uses, the product can be dispersed on an inert finely divided solid such as talc, chalk or bentonite and employed as a dust. Such mixtures also may be dispersed in water with or without the aid of a surface active agent, and the resulting aqueous suspension employed as sprays, drenches, or washes. In other procedures, the product is employed as an active constituent in solvent solution, oil-in-water or water-in-oil emulsions, or aqueous dispersions. In representative operations excellent controls and kills of intestinal roundworms and two-spotted spider mites are obtained with aqueous compositions containing 500 parts per million by weight of 2-propynyl 1-(2-propynyloxy)-2-naphthoate.

I claim:
2 - propynyl ester of 1 - (2 - propynyloxy) - 2 - naphthoic acid.

References Cited by the Examiner
UNITED STATES PATENTS
3,097,230   7/1963   Miller _____ 260—473

LORRAINE A. WEINBERGER, *Primary Examiner.*
S. B. WILLIAMS, *Assistant Examiner.*